Sept. 17, 1929.   J. W. SEIGH   1,728,257
BAIL EAR FOR PAILS
Filed Dec. 29, 1928

INVENTOR
J. W. Seigh
BY
N. E. Dunlap
ATTORNEY

Patented Sept. 17, 1929

1,728,257

UNITED STATES PATENT OFFICE

JOSEPH W. SEIGH, OF WHEELING, WEST VIRGINIA, ASSIGNOR TO CONTINENTAL CAN COMPANY, OF NEW YORK, N. Y., A CORPORATION OF NEW YORK

BAIL EAR FOR PAILS

Application filed December 29, 1928. Serial No. 329,117.

This invention relates broadly to pails, and more specifically to an ear of that type employed on sheet-metal buckets or pails for the attachment of the bail.

The primary object of the invention is to prove a bail ear for sheet metal pails which is simple and inexpensive to manufacture and which shall be proof against leakage of fluid or semi-fluid contents of the pail.

A further object is to provide a device of the character mentioned having such construction that, without the application thereto of liquid solder during the course of manufacture, a close and leak-proof joint is provided.

In describing the invention in detail, reference is herein had to the accompanying drawings, in which—

Figure 1:
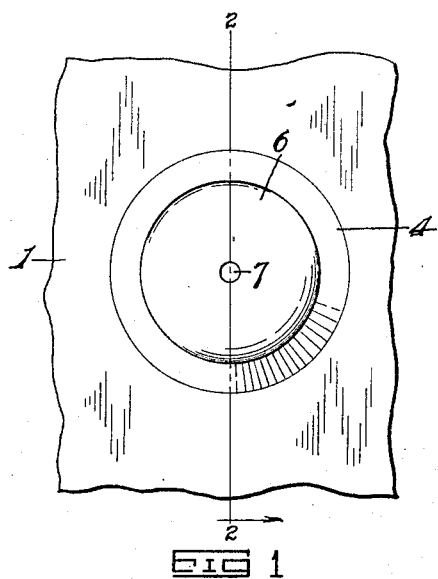
Figure 1 is a side elevation of a fragmentary portion of a pail body, showing the ear mounted thereon.

Referring to said drawings, 1 designates the pail body which has formed therein a circular opening 2 adapted for the reception of the bail ear, said opening being defined by an inwardly directed flange 3 carried by an outwardly-dished inclined wall 4 of said pail body. Formed intermediate said flange 3 and said inclined wall is a circular channel 5 of approximately V-shape designed for the reception of parts of the ear structure, as will hereinafter be described.

The opening 2 is adapted to receive therein in snugly-fitted relation to its defining flange 3 a sheet metal ear member 6 of cup shape which has therein a centrally located aperture 7 designed for receiving in pivotal relation thereto an end of a common form of bail by means of which the pail may be lifted and carried. Said ear member, or cup, 6 is formed with an external annular flange 8 at its inner end adapted to seat upon a sheet-metal disk-like backing member 9 which has an annular outwardly directed flange 10. Interposed between said flange 8 of said cup 6 and the backing member or disk 9 is the base member of a circular gasket 11 of sheet solder which has an outwardly directed flange 12 adapted to be snugly received between the flange 10 of the disk and the outer edge of the flange 8 of the cup, as is shown in Fig. 7 wherein the parts occupy preliminarily assembled relation.

Figure 7:
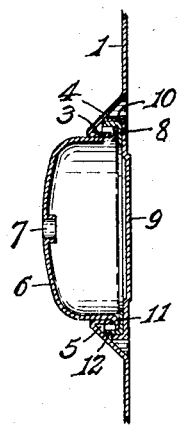
Figure 7 is a similar view of said parts disposed in assembled relation and ready for application of the seaming pressure.

The elements forming the ear, assembled as in Fig. 7, wherein the various flanges occupy positions within the channel 5, are permanently attached to the pail body by a seaming operation which consists in subjecting the joint-forming parts thereof to pressure which acts to turn or roll the flanges 8 and 10 into interlocked relation, with the body and flange of the solder gasket closely compressed, first, between the body of the disk 9 and the cup flange 8; second, in full face relation to the confronting surfaces of the flanges 3 and 10, and, third, between said flange 10 and the inclined wall 4 of the pail body.

Figure 2:
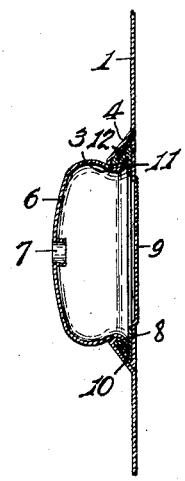
Figure 2 is a section on line 2—2, Fig. 1.
Figures 3, 4, 5, 6:
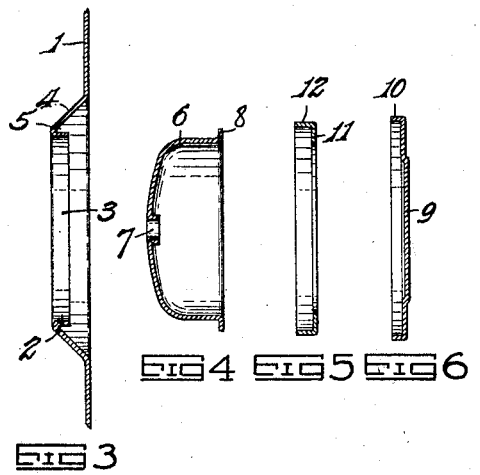
Figures 3, 4, 5 and 6 are separate views, in central vertical section, of the pail body, the cup, the solder gasket and the backing, respectively; and—

It will be understood that, due to the softness and plasticity of the solder material of the gasket, the said material is deformed and displaced by the applied pressure to the extent that some thereof is introduced by extrusion in the various fissures of the joint, including a portion of the space between the flange 10 and the wall 4, as is shown in Fig. 2 of the drawings.

In this connection, I am aware that, in the manufacture of bail ears, it has been proposed heretofore to employ a thin paper gasket between a cup-like ear member and a backing member. Such, however, has not been wholly successful in rendering the joint leak-proof for the reason that a paper gasket is not capable of having the material thereof extruded to enter the interstices of the joint, and particularly because none of such material can, through pressure, be displaced so as to occupy a position between the inclined wall 4 and the disk-flange 10.

What is claimed is—

1. The combination with a pail body having therein an outwardly directed inclined wall terminated by an inwardly directed flange which defines a circular opening, a cup-like member fitted within said opening and having an external annular flange, a backing member having an outwardly directed annular flange, and a gasket of extrusible material interposed between said member and said backing, all of said flanges being seamed together with said gasket compressed to the extent that material thereof is introduced by extrusion in the various fissures of the joint, including a portion of the space between the backing flange and the inclined body wall.

2. The combination with a pail body having therein an outwardly directed inclined wall terminated by an inwardly directed flange which defines a circular opening, a cup-like member fitted within said opening and having an external annular flange, a backing member having an outwardly directed annular flange, and a flanged solder gasket interposed between said member and said backing and between the flange of the latter and the cup flange, all of said flanges being seamed together, the flange of said gasket being so compressed that material extruded therefrom seals the space between the backing flange and the inclined body wall.

3. The combination with a pail body having therein an outwardly directed inclined wall terminated by an inwardly directed flange which defines a circular opening, a cup-like member fitted within said opening and having an external annular flange, a backing member having an outwardly directed annular flange, and a gasket of extrusible material interposed between said member and said backing, said gasket being formed with an outwardly directed flange, all of said flanges being seamed together within the close embrace of said inclined body wall, said gasket flange being so compressed that material thereof is extruded into sealing relation to the space between the backing flange and said wall.

4. The combination with a pail body having therein an outwardly directed inclined wall terminated by an inwardly directed flange which defines a circular opening, a cup-like member fitted within said opening and having an external annular flange, a backing member having an outwardly directed annular flange, and a flanged solder gasket interposed between said member and said backing, said gasket having an outwardly directed flange, all of said flanges being seamed together, said gasket flange closing the joints between the body of said backing member and the cup flange, between said backing flange and the opening defining flange of the pail body and between said backing flange and the inclined wall of the pail body.

In testimony whereof, I affix my signature.

JOSEPH W. SEIGH.